United States Patent [19]

Brown

[11] 4,387,745
[45] Jun. 14, 1983

[54] APPARATUS AND METHODS FOR HANDLING AND CONTROLLING WIRE IN WINDING APPLICATIONS

[75] Inventor: Ronald H. Brown, Hamilton, Mich.

[73] Assignee: General Electric Company, Fort Wayne, Ind.

[21] Appl. No.: 201,220

[22] Filed: Oct. 27, 1980

Related U.S. Application Data

[63] Continuation-in-part of Ser. No. 114,880, Jan. 24, 1980, abandoned.

[51] Int. Cl.³ .............................................. B21F 3/00
[52] U.S. Cl. ..................................... 140/92.1; 72/66
[58] Field of Search ............... 140/92.1; 72/66; 57/67, 57/76, 115; 242/25 R, 25 A, 45

[56] References Cited

U.S. PATENT DOCUMENTS

| | | |
|---|---|---|
| 2,647,705 | 8/1953 | Gilmore . |
| 3,087,689 | 4/1963 | Helm . |
| 3,130,757 | 4/1964 | Schellack . |
| 3,371,911 | 3/1968 | Parisien . |
| 3,383,542 | 5/1968 | Vanderjagt . |
| 3,493,017 | 2/1970 | Govaert .................................. 72/66 |
| 3,533,574 | 10/1970 | Cooper et al. . |
| 3,672,026 | 6/1972 | Cutler et al. . |
| 3,672,040 | 6/1972 | Arnold . |
| 3,732,897 | 5/1973 | Arnold et al. . |
| 3,765,080 | 10/1973 | Lauer . |
| 3,933,318 | 1/1976 | Yajima et al. . |
| 3,958,611 | 5/1976 | Lesch et al. ...................... 140/92.1 |
| 3,964,525 | 6/1976 | Arnold et al. . |
| 3,967,658 | 7/1976 | Arnold . |
| 3,973,601 | 8/1976 | Arnold et al. . |
| 3,977,444 | 8/1976 | Lauer et al. . |
| 4,056,238 | 11/1977 | Ciniglio et al. ................... 140/92.1 |
| 4,172,374 | 10/1979 | Hagglund ......................... 140/92.1 |

FOREIGN PATENT DOCUMENTS 1192144  5/1965  Fed. Rep. of Germany .......... 72/66

Primary Examiner—Lowell A. Larson
Attorney, Agent, or Firm—Ralph E. Krisher, Jr.

[57] ABSTRACT

A high speed coil winding machine employing a wire feed flyer arm rotating about a coil form having stepped turn form positions of progressively increasing size and provided with apparatus rotatable with the flyer arm for tensioning the wire between the flyer arm and the coil form to stabilize the wire as it is fed to the coil form. Improved crossover control to successive turn form positions is achieved. Specific wire tensioning structures are disclosed. Also disclosed are methods and means for taking up slack wire by utilizing centrifugal forces and accumulating such slack wire to provide a supply of wire during intervals of rapidly increasing wire demand.

3 Claims, 7 Drawing Figures

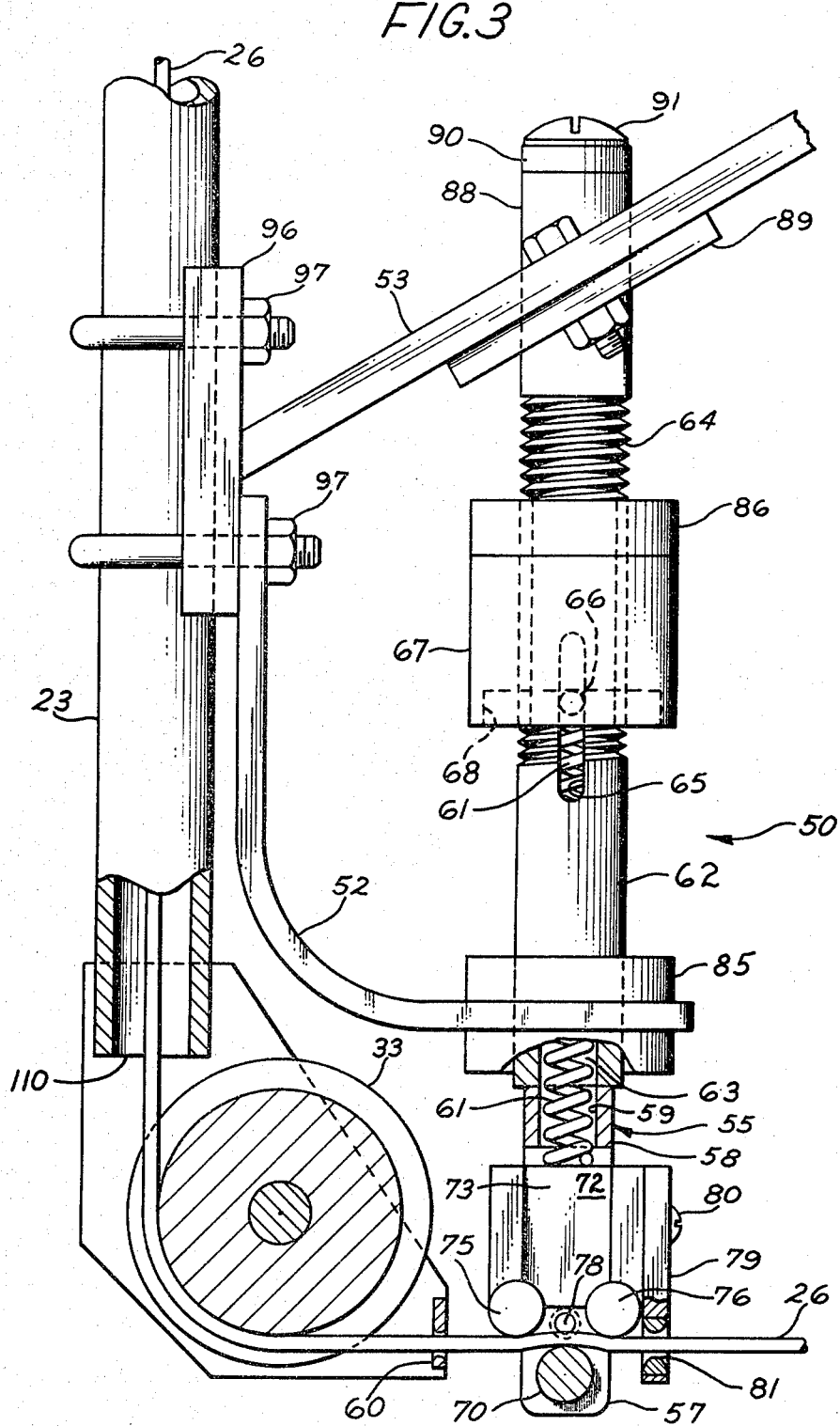

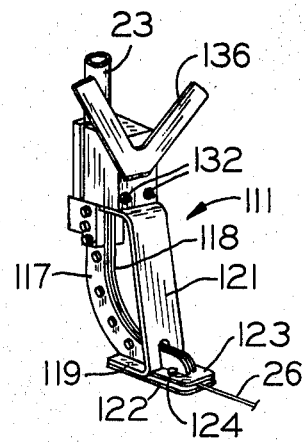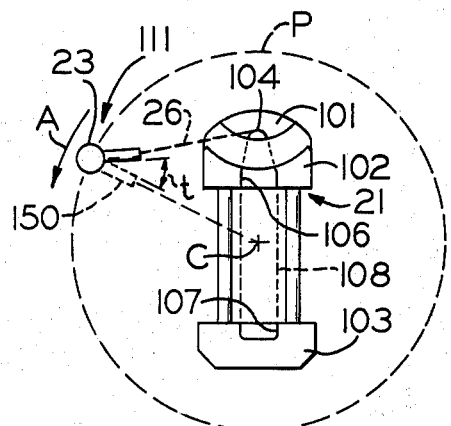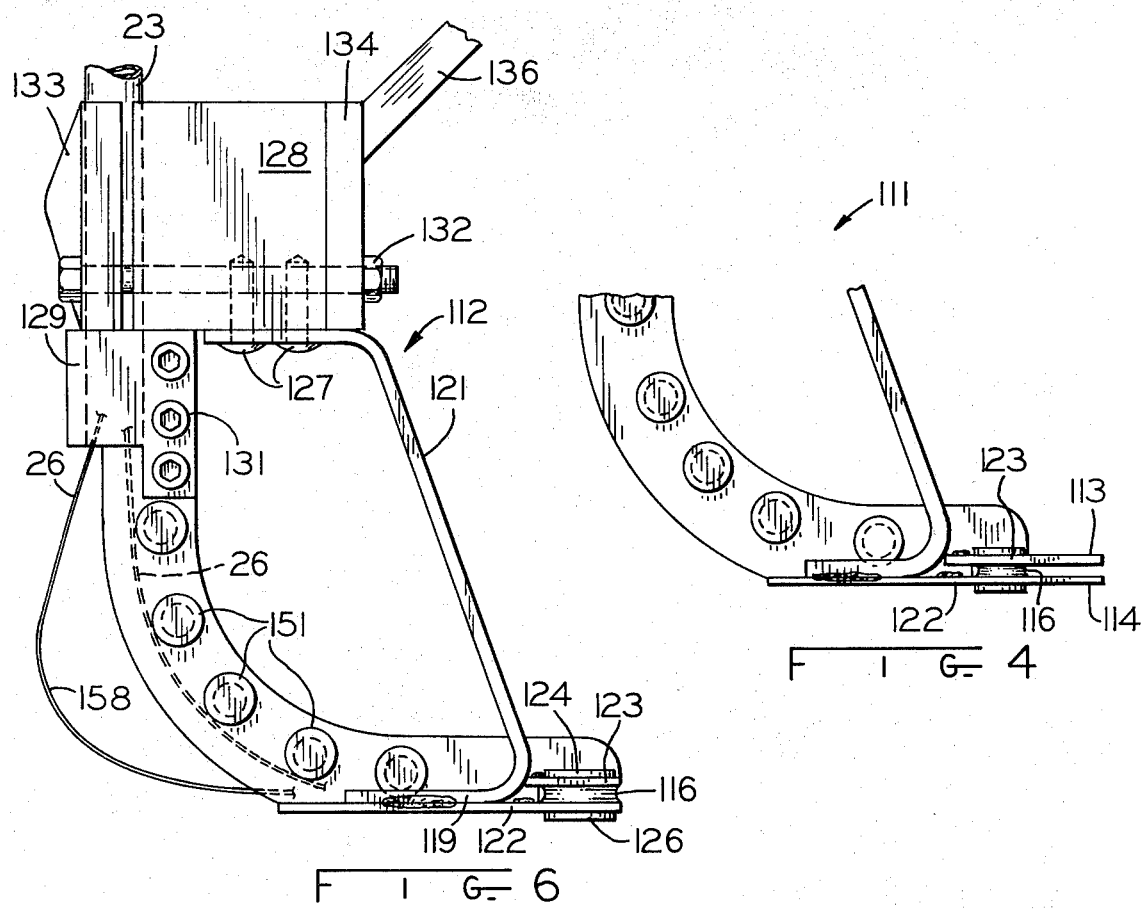

APPARATUS AND METHODS FOR HANDLING AND CONTROLLING WIRE IN WINDING APPLICATIONS

CROSS REFERENCE TO RELATED APPLICATIONS

This application is a continuation-in-part of my pending application Ser. No. 114,880 which was filed Jan. 24, 1980 (now abandoned); and the entire disclosure of which is incorporated herein by reference. Also related in subject matter is application Ser. No. 200,797 filed on the same day as this application in the name of Philip G. Rodenbeck, entitled "Flyer Method and Apparatus", and assigned to the same assignee as this application. The entire disclosure of said Rodenbeck application is also incorporated herein by reference.

BACKGROUND OF THE INVENTION

The present inventions relate to winding applications, one example of which is a continuous coil winding machine employing a flyer arm wire feed and a coil form with a plurality of stepped turn positions of progressively increasing size. More specifically it relates to apparatus for stabilizing the wire fed to a coil form for providing improved control of the position of wire strands or segments wrapped across the form in general, and in particular to the position of "crossover" that links adjacent coils of different sizes. In one particular aspect, the invention relates to a novel tension approach useful in stabilizing the wire fed to the coil form during the coil windings process; in another aspect, it relates to improving the "lay" of wire as it is wrapped about the form; in yet another, it relates to means for accommodating excess lengths of wire that intermittently briefly occur between the wire supply and coil form; and in still another form to methods and apparatus that reduce the stress on the insulation coating on wire being handled.

Automatic coil winding machines used, for example, to wind stator core windings of dynamoelectric machines are well known. In one known form of such machines, wire is wrapped around a coil form in a high speed manner by a flyer arm wire feed mechanism which is mounted for rotation about the coil form. Typically the coil form generally comprises a plurality of turn forming sections about which differently sized turns may be produced. Such forms also are adjustable so as to permit a given coil form to be used for winding coil groups for cores of different stack heights. For convenience in the following disclosure, it will be assumed that motor coils are being wound, although it will be appreciated that my invention itself may be used for other applications.

For a given motor design, it is usually desired to wind in a continuous manner a complete coil structure having a number of turn groups of progressively increasing size, i.e. with increasing sizes of mean turn length or turn circumference (circumference is used herein to denote turn perimeters that are rectilinear in shape, elipsoid, or oblong, as well as circular). This is accomplished by providing a coil form of stepped configuration with winding commencing on the smallest circumference form portion. When a sufficient number of turns have been wound, the relative position of the wire feeder (or flyer) and coil form is changed, usually by axial movement of the coil form, so as to cause the wire to jump to the next larger stage or portion of the coil form. This process is repeated with subsequent portions or stages of the form until a desired group of differently sized coils is completely wound.

In the course of the winding process, each group of turns (or coil) formed about a given stage of the coil form is caused to be placed in a predetermined position in a coil magazine or coil injection apparatus such that the relative position of the turns are maintained until the turns are injected in well-known manner into appropriate slots, for example, of a motor stator core. In order to assure that the wire is not stretched or broken during this injection process, proper crossover control during the winding process is important. That is to say it is well known that the transition or "jump" of the wire from one turn form position to the next in the winding process must occur at a predetermined angular position of the flyer arm relative to the coil form. Specifically, the transition must occur such that the jump wire leads from the smaller turn group at the end which is inserted into the magazine or coil injection apparatus ("tooling") to the larger turn at the trailing end, i.e. the end of the coil remote from the tooling. This is to assure that the circumferential length of the transition or jump wire is long enough to accommodate the injection process without being pulled up against the rear or bottom side of the stator core which, if allowed to occur, could cause the wire to be unduly stretched and possibly broken. Similarly, it is necessary to assure that crossover or jump does not occur until the required number of turns have been wound in the turn group in order to avoid the formation of stray turns of odd size. These various criteria have now been long known in the art and are discussed at length in Arnold et al U.S. Pat. Nos. 3,973,601 of Aug. 10, 1976; Arnold 3,967,658 of July 6, 1976; and Lauer U.S. Pat. No. 3,765,080 of Oct. 16, 1973. These three patents are assigned to the same assignee as the present application, and the entire disclosures of all three of these patents are incorporated herein by reference.

Wire jump that undesirably occurs in the middle of a turn group or that occurs on the wrong side of the coil form when transitioning between coil groups is known to be caused in some instances by unstabilized wire feed from the flyer arm to the coil form during the extremely high speed winding process. Wire stability is adversely affected by the sudden and drastic changes in wire feed rates caused by the circular rotation of the flyer arm about a coil form that is normally non-circular in configuration. The inertia of the wire causes the wire to whip or flop up and down outside its normal feed plane as it reaches the coil form. If the whip is sufficient in magnitude, the wire can land on the next higher (larger) turn form position resulting in an incorrect jump despite the fact that the form and flyer have not been changed in their relative positions.

Prior attempts to avoid this problem have taken the form of, for example, "halo" rings surrounding the coil form in the plane of the feed wire in an attempt to stabilize the wire against the occurrence of whip as it approaches the form. A similar attempted solution is the use of masking plates lying very close to the plane of the feed wire, the plate having an aperture aligned with the coil form and having sufficient through clearance to allow the coil turns to move into the receiving magazine or coil injection apparatus. Although such attempted solutions have been shown to provide some advantage in improving wire stability, they have not been entirely successful. In addition, they have the disadvantage of adding interfering structure in the vicinity of the coil form and flyer arm that make it difficult to perform machine set up and adjustment procedures.

Problems have also been encountered with some winding equipment in the nature of damaging the enamel or insulation on wire. Thus, in some applications, enamel is abraded from the wire by the flyer mechanism.

It is therefore an object of the present invention to provide an improved apparatus and methods that obviate the problems and disadvantages discussed hereinabove.

It is another object of the present invention to provide apparatus that improves crossover control in a coil winding machine of the type employing a high speed flyer arm rotating about a stepped configuration coil form.

It is a further object of the invention to provide improved apparatus and methods that substantially eliminate the adverse effects of wire inertia as it relates to unwanted jump of the feed wire to the next larger turn form position of the coil form.

It is a still further object of the invention to provide apparatus and methods that improve feed wire stability in a winding machine environment without the inconvenience of added structure around or near the coil form.

It is yet a further object of the invention to provide apparatus for a coil winding machine that is mounted for rotation with a flyer arm to stabilize the feed wire without unduly interfering with set up and machine adjustment procedures between winding operations.

It is yet another object of the invention to provide apparatus for the described coil winding machine that enables convenient adjustment for optimum wire stabilization with differing winding conditions and wire size and strength and the like.

It is yet still another object of the invention to provide improved methods and apparatus whereby wire enamel damage is minimized, and particularly while accomplishing various ones of the objects pointed out hereinabove.

SUMMARY OF THE INVENTION

In accordance with one form of the invention there is provided a coil winding machine for producing a plurality of continuous wound coils having progressively increasing coil group sizes wherein the machine comprises a frame, a coil form having a plurality of stepped turn form positions or stages of progressively increasing size, and a flyer arm mounted for rotation about the coil form. The machine further includes means for supplying wire through the flyer arm to the coil form as the flyer arm rotates about the form and includes wire tension means for introducing a preselected degree of tension on the wire between the flyer arm and the coil from as the wire is being wound on the form. Sufficient tension is introduced by the tension means to stabilize the wire during the coil forming process to thereby avoid inadvertent jumping of the wire to an undesired turn position on the form.

In another form of the invention, a method is practiced wherein the inertia of the wire being fed, via the flyer, from a supply to the form is absorbed before the wire exits the flyer so as to reduce the "flutter" of wire between the flyer and form. In preferred embodiments, the amount of stress placed on the wire is also reduced as the feed rate demand for wire suddenly increases due to the non-circular shape of the coil form.

In yet another form, a method is practiced such that wire is directed from the flyer in such a manner that it wraps more gently about the coil form and so that it is not forced to bend as sharply at the exit from the flyer. This contributes to reduced enamel damage and also, it is believed, to less wire stretching.

Apparatus embodying certain features of the invention includes a flyer designed such that centrifugal faces apply tension to relatively unconfined portions of wire which thus are not subjected to abrasion because of the unconfining design. In another form, the wire discharge portion of the flyer (or "nozzle") is canted with respect to the coil form so that wire emanating therefrom is not bent as drastically as heretofore, and thus is subjected to less enamel damaging stress. In this latter form, the flyer nozzle is directed so as to "trail" the flyer, as will become more apparent from the detailed description presented hereinbelow.

In accordance with another specific aspect of the invention, a wire tensioning device may be provided for rotation with the flyer arm of a coil winding machine which is adapted to contact the wire between the flyer arm and the coil form of the machine to create a preselected degree of stabilizing tension on the wire as it is being wound on the form. In one preferred form of the invention, the tensioning device comprises a U-shaped bracket having parallel arms straddling the wire as it exits the flyer arm. At least one fixed wire bearing surface spans the arms at the open end of the bracket and a movable pressure block is channelled between the parallel arms, the block having at least another wire bearing surface on the opposite side of the wire from the first mentioned bearing surface. The device is also provided with means for applying a force to the pressure block in a direction to bring the surfaces into contact with the wire with a magnitude sufficient to impart the desired degree of stabilizing tension to the wire.

BRIEF DESCRIPTION OF THE DRAWINGS

FIG. 3 is a side elevational view of the tensioning device of FIG. 2 mounted on a flyer arm of a coil winding machine;

FIG. 4 is a side elevational view of parts of another flyer that embodies the invention in another form, and that may be used while practicing the invention;

FIG. 5 is a perspective view of the structure shown in FIG. 4;

FIG. 6 is a side elevational view of another flyer, similar to the flyer of FIG. 4; and FIG. 7 is a schematic representation of the canted relationship of the flyer of FIG. 4 with respect to a coil form during operation.

DETAILED DESCRIPTION

Figure 1:
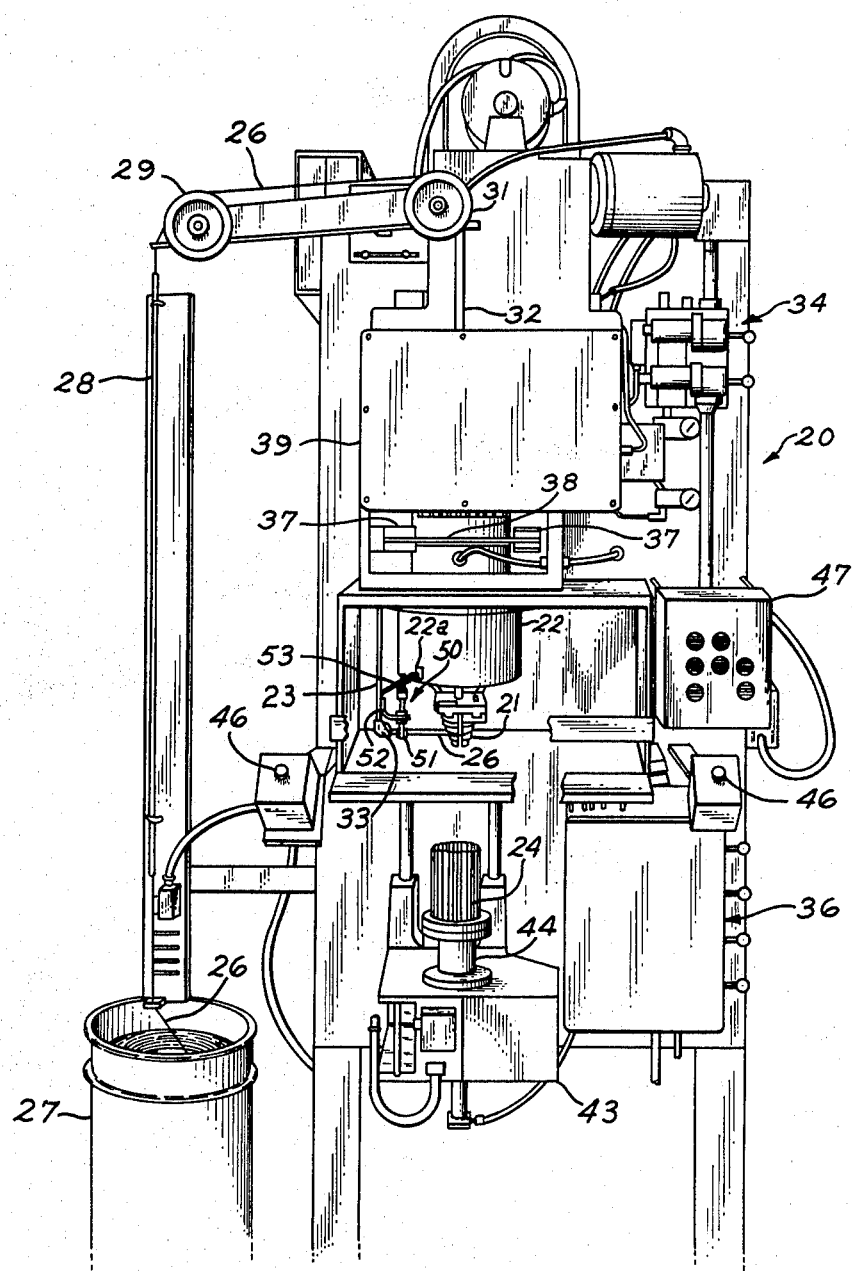
FIG. 1 is a perspective view of a coil winding machine, in the environment of which the invention may be practiced, and embodying the invention in one form thereof.

Referring now to FIG. 1, there is illustrated winding apparatus 20 that embodies features of the invention in one form, and which may be used to practice aspects of the invention. Apparatus 20 includes a winding turn generating assembly that is revealed as including turn size and shape determining means—illustrated as a turn-/coil form 21 and wire dispensing means shown as including a flyer drum 22 and flyer arm 23.

During operation of apparatus 20 in a wind and shed manner, coil receiving means, shown as magazine 24, is in an elevated interfitting relationship with form 21 and receives winding turns as they are shed from the form. As initial turns of a given coil are being shed, still one or more subsequent turns of the same coil are being formed by turn former 21, all as will be understood by persons skilled in the art. It should be specifically noted, however, that the invention may be embodied in, and practiced with, other types of winding equipment (e.g., horizontally disposed forms and flyer arms or winding equipment wherein multi-turn coils are wound on a mold or form and then moved away on a winding turn receiver—sometimes after collapsing parts of the mold or form to reduce tension on the wire).

A brief description of the operation of apparatus 20 will now be presented, but only for purposes of illustration. Wire 26 is supplied from wire supply 27 along guides such as tube 28, pulleys 29, 31, and tube 32, to flyer arm 23 and pulley 33. As the flyer arm 23 rotates with drum 22, wire is wrapped about segments of coil form 21 that are aligned with the plane of revolution of the wire feeding part or pulley 33.

In initially preparing apparatus 20 for operation, the control device for the apparatus is set in order to program the apparatus for a desired winding sequence or mode of operation. This control device may be built into apparatus 20 and be covered by a rear panel, or it may be a more remotely located device such as a computer. If the latter, programming may be accomplished with punched cards or tape, or magnetic tape or discs, or any other approach used with the particular computer chosen for use. If the former, a series of counters or switches on a control panel may be set. The counters and switches then would insure that coil groups for two pole, four pole, six pole, eight pole, etc., winding arrangements would be formed; and that each coil group would have a desired number of coils per coil group and winding turns per coil. This is assuming, of course, that the winding equipment in general, like apparatus 20 in particular, is capable of use in the production of windings for dynamoelectric machines, e.g. motors, of the selected number of winding poles. The setting of switches or counters also would determine the number of blade units or angle through which magazine 24 will index after each coil group is formed, and also whether such coil group would be of even or odd span, as is known in the art, and as is discussed in detail, for example, in Lauer et al U.S. Pat. No. 3,977,444 which issued Aug. 31, 1976, and the entire disclosure of which is incorporated herein by reference.

It will be understood that during operation of apparatus 20 respective cylinder and control means 34, 36 may be used to control: the action of brake pads 37 on brake disc 38; the operation of jump control apparatus located within housing 39; the movement of base 43 which moves pedestal 44 up and down so that magazine 24 may receive winding turns or may be indexed or removed from apparatus 20, and so forth. Of course, each cycle of operation of apparatus 20 will be initiated by simultaneous depression of start buttons 46, while panel 47 may be used to indicate (by lights or switch position) whether power is on, and malfunctions of apparatus 20.

In accordance with an aspect of the invention, a wire tensioning device 50, to be described in greater detail subsequently, is mounted by means of brackets 52 and 53 on flyer arm 23 and flyer drum 22 for rotation with the flyer arm during the winding process. Device 50 is adapted to contact wire 26 at point 51 as the wire exits flyer arm 23 at pulley 33 thus to create tension in wire 26 between the flyer arm 23 and coil form 21, the tension being of a sufficient degree, as hereinafter described, to stabilize the wire as it approaches coil form 21 and thereby minimize the likelihood of undesired wire jump occurring from one turn form position to another on coil form 21.

Figure 2:
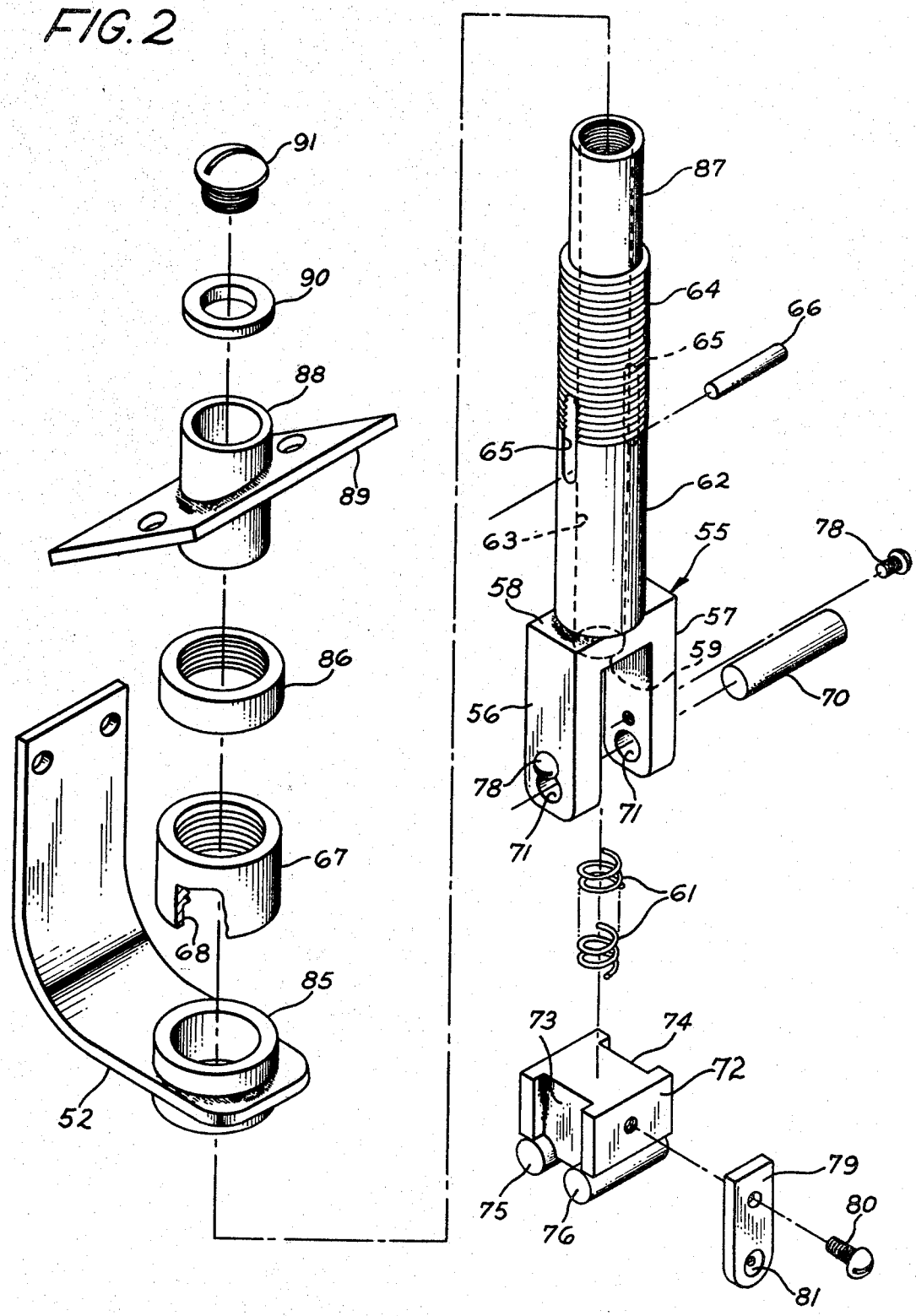
FIG. 2 is a perspective view in exploded format illustrating a wire tensioning device useful in practicing the invention in one form thereof.

Referring now more specifically to FIGS. 2 and 3, the wire tensioning device 50 will now be described in greater detail. Thus device 50 comprises a U-shaped bracket 55 having parallel arms 56, 57 which straddle wire 26 as it exits the flyer arm 23 via wire guide 60. As illustrated, the arms 56, 57 are connected at their upper ends by a horizontal bight portion 58 through which extends a hole 59 that in turn accommodates a compression spring 61. Bracket 55 is attached to a column 62 which has an axial hollow bore 63 and a threaded outer circumference 64 extending along at least a portion of the length of column 62. Elongated slots 65 are formed in the circumferential walls of column 62 to permit a retainer pin 66 to be inserted therein, the length of pin 66 being slightly greater than the diameter of column 62. An adjustment nut 67 is threaded down onto column 62 and is provided with a recess 68 for retention of pin 66 therein. The hollow bore 63 and hole 59 in the bight portion 58 of U-bracket 55 are aligned to enable spring 61 to extend up into column 62 and bear at its upper end against retainer pin 66.

A cylinder or pin 70, preferably of an abrasion resistant material, such as highly polished carbide steel, is inserted through holes 71 at the free ends of arms 56, 57. The pin 70 spans arms 56, 57 crosswise of wire 26 as it exits flyer arm 23. Cylinder 70 preferably is removably positioned within holes 71 and is held in place by retaining screws 78, the heads of which overlap the ends of cylinder 70. A pressure block 72 is movably positioned within the arms 56, 57. The block 72 is held in place by channels 73, 74 thereon which mate with arms 56, 57. Furthermore, the block 72 is prevented from falling away from arms 56, 57 by pin 70. The underside of pressure block 72 is provided with a pair of cylinders 75, 76 preferably formed of the same abrasion resistant material as cylinder 70, which are spaced apart crosswise of wire 26 so as to at least partially straddle cylinder 70.

Spring 61 bears at its lower end against pressure block 72 and defines means for applying a force against block 72 in a direction to bring cylinders 75, 76 and 70 into contact with wire 26. As illustrated schematically in FIG. 3, wire 26 undergoes a slight bending as it passes between the straddled cylinders 70, 75, 76. A wire guide 79 is secured to the exit side pressure block 72 by suitable means such as screw 80. Preferably, the eyelet 81 of guide 79 is also formed with an abrasion resistant material, such as carbide steel.

In its assembled form, column 62 is inserted through and held by collar 85 formed on the horizontal portion of bracket 52. A locking nut 86 is threaded onto column 62 and serves to lock adjustment nut 67 in place at the point at which suitable compression force has been applied to pressure block 72. A reduced diameter smooth circumference portion 87 of column 62 is inserted through collar 88 fastened to (e.g., by welding), and thus carried on bracket plate 89. The column portion 87 is held in collar 88 by a washer 90 and a short retaining bolt 91 which is threaded into the upper end of column 62. Bracket plate 89 is secured to diagonal support bracket 53, the lower end of which is mounted to flyer arm 23 via a footing plate 96 which is held on arm 23 by any suitable means such as U-bolts 97. The upper end of bracket 53 is attached to flyer drum 22 via footing bracket 22a (FIG. 1). The curved support bracket 52 which holds the lower end of column 62 in place is also secured to flyer arm 23 by suitable means such as U-bolts 97.

In operation, the wire from flyer 23 is manually fed past pressure cylinders 75, 70, 76, and wire guide eyelet 81 by raising pressure block 72 against the bias of spring 61. If necessary, adjustment nut 67 may be raised to release some of the compressive force on spring 61 for this purpose. Nut 67 is then adjusted to provide sufficient force on wire 26 to create preselected tension on wire 26 during the winding process. The amount of tension necessary to achieve the desired crossover control and avoidance of undesired jump may be determined empirically using well known resistance measuring techniques applied to sample coil windings made during initial set up or machine adjustment procedures. Preferably, enough tension should be placed on wire 26 between the flyer arm 23 and coil form 21 to achieve the desired results of the invention without exceeding resistance measurement limits that would indicate excessive stretching of the wire. Thus the present invention may be practiced without precise delineation of specific tensioning of the wire, it being adequate to note that a fairly broad range of tensioning may be employed within the limits, at one end, of achieving the desired results and, at the other end, of over stressing and thus over stretching of the wire during the winding process.

It will now be appreciated that there has been described a simple and easily implemented form of the invention whereby coil windings of progressively increasing sized turn groups may be formed with reliable control of the point of transition between turn groups and with minimized unwanted jump during the winding of a given turn group. The employment of a tensioning device in which the tensioning force is applied between the flyer arm and the coil form has been found to be particularly advantageous in substantially eliminating the adverse jump effects caused by wire inertia in coil winding machines as contemplated by this invention. Moreover, the tensioning device described herein permits variable adjustment of the degree of tensioning making it adaptable to a wide range of wire sizes and coil designs.

While the methods and structure described herein to this point are completely suitable for use in many applications and solve the flutter and crossover problems discussed herein; problems may still remain in those applications where relatively easily damaged magnet wire enamel is used. For example, in those applications where small diameter copper wire specially insulated for use in hermetically sealed applications is used (e.g. wire in the range of sizes from about 0.0359 to 0.0508 inches in diameter), excessive abrasion or flexing of such wire may cause powdering or other damage to the enamel insulation disposed thereon. This powdering or other damage may be particularly noticeable as the wire undergoes a relatively sharp bend about the wheel 33 (see FIG. 3) or as the wire is forced to follow the relatively tortious path established by the cylinders 75, 70, 76 (again, see FIG. 3). It has now also been determined that excessive abrasion of the wire may occur as the wire exits the bottom of the flyer tube 23 (see FIG. 3) and just before such wire moves about the pulley 33.

It is now believed that the problems discussed herein as well as many of the other problems known in the art of producing windings for electric motors are related (at least in part) to the fact that the wire moving down through the flyer structure and to the coil form is actually pulsating (i.e., constantly changing velocity) rather than moving at a fixed velocity even when the flyer is rotating at a constant or fixed speed. The reason for the pulsing movement of the wire feeding through the flyer will be better appreciated by reviewing FIG. 7 from which it will be understood that the flyer tube 26 traverses a circular path P having a center at the point C and extending about the coil form assembly 21. The assembly 21 of course comprises a front form portion 101, a middle form portion 102, and a rear form portion 103. During operation of the equipment represented by FIG. 7, a given turn of wire will be wrapped about stage 104 of form portion 101, against a surface of stage 106 of coil form portion 102; and about the stage 107 of coil form portion 103. The actual shape and proportion of such a coil has been represented in phantom in FIG. 7 and identified with the reference numeral 108.

It will be appreciated that the final shape of the turn 108 is oblong or rectangular, and that the actual length of wire required by the form during any small constant increment of travel of the flyer tube 23 will depend upon the angular position of the flyer tube 23 with respect to the coil form assembly 21. Thus, during each revolution of the flyer tube 23, the rate at which wire is fed from the flyer tube will pulsate due to the varying demand for wire represented by the stationary non-circular coil form. Accordingly, during one increment of travel of the flyer tube, the demand for wire will increase, with the result that the feed rate of the wire will rapidly accelerate or increase; and increased tension will be put on the wire all the way from the form assembly 21 back to the wire supply 27 (see FIG. 1). Very shortly after a maximum demand for wire occurs, the flyer tube 23 traverses a different portion of the form assembly 21, and the required feed rate for the wire itself is reduced. However, even the smallest sized wires have inertia, and the momentum of the wire moving along the various paths in the apparatus 20 and along the flyer will tend to cause excesses or loops or undulations of wire to be thrown therein. This contributes to the "flutter" of wire between form assembly and exit of the flyer. This also contributes, it is believed, to a flutter type of action as the wire approaches wheel 33 (see FIG. 3); and it is believed that this causes extra abrasion of the wire enamel on the edge 111 of flyer tube 23.

In the case of the structure shown in FIG. 3 wherein the cylinders 75, 70, and 76 apply tension to the wire as it leaves the flyer, it is now believed that the excess or pulsing wire on the supply side of cylinder 75 may actually increase the tendency of the wire to pulsate within the tube 23 and flutter with respect to the guide wheel 33 (at least for some flyer speeds and for some wire sizes).

When another particular aspect of the present invention is followed, the inertia of the wire being fed through the flyer is utilized to advantage and its effect is used to actually prevent flutter of the wire (and problems associated therewith) between the flyer and the form assembly. More specifically, flyers such as those illustrated at 111 and 112 embody other features of the invention and are useful in practicing other inventive aspects, as will now be explained.

The flyers 111 and 112 are substantially identical to one another, the only difference therebetween being readily apparent from a review of FIGS. 4 and 6 from which it will be apparent that duck-bill like wire flutter controlling extensions 113, 114 of the wire dispensing mouth 116 are provided on flyer 111, but have been eliminated or not provided with the flyer 112. A review of the structure shown in FIGS. 4–6 also will reveal that the flyers 111, 112 are not provided with a wire tensioning device at the flyer mouth as is the case of the structure shown in FIG. 3; although the same could be used with the flyers 111 and 112, it being recognized that some of the advantages of the flyers 111, 112 now to be described might however, as a result of such utilization, not be realized.

The flyers 111, 112 are "open-backed" and are specifically designed to provide a minimum amount of drag and confinement for the wire 26 as it moves therethrough. The flyers 111, 112 are comprised of a pair of curved side plates 117, 118 held together at the lower end thereof by legs 119 of a bifurcated portion of carrying strap 121. The legs 119 are fastened by any suitable means, such as welding, to the side plates 117, 118 and to a lower plate 122. Overlying the end of the lower plate 122 is an upper plate 123. Disposed between the upper and lower plates 123, 124 (on each side of the plates 117, 118) are a pair of carbide rollers or guides 126 which conjointly keep the plates 122, 123 in spaced apart relation. Nuts 126 and bolts 124 thus hold the upper plate 123 to lower plate 122 which in turn is welded to the support 121 as previously described.

It will be best seen from FIG. 6 that the support 121 is fastened by means of screws 127 to a mounting block 128 which is provided with depending legs 129 that are fastened (e.g. by means of screws 131) to the side plates 117, 118. The mounting block 128 itself is clamped to the flyer tube 23 by means of a pair of bolts 122 and a clamping block 123. Also held by the bolts 132 is a weldment comprising an adapter plate 134 and strut 136. The V-shaped strut 136 is fastened to the flyer drum for stability in the same fashion as the strut or plate 53 shown in FIG. 3.

The flyer structure 111, 112 (as the case may be) is mounted on the flyer tube 23 so that the outlet of the flyer is not pointed directly at the center of revolution of the flyer. Heretofore, it has been common practice to mount the dispensing portion of a flyer so that its outlet was pointed directly towards the center C (see FIG. 7) as indicated by the phantom flyer outline 150 in FIG. 7. Thus, a radial line directed outwardly from point C would not only intersect the axial feed line of wire along tube 23, but would also extend along the center of the wire outlet nozzle.

With the embodiments illustrated herein, the flyer nozzles are oriented so that they are angled in an angle t of about 30° in a direction trailing a centrally directed flyer orientation as represented by the line 150. Thus, upon rotation of the flyer tube 23 in the direction of arrow A, the flyers 111, 112 will be angled in a backward direction as best revealed in FIG. 7. This backward orientation of the wire dispensing mechanism contributes to improved wire rap and coil turn development action about the coil form assembly 21. In this regard, the importance of providing the discharge guides 126 and feeding the wire 26 outwardly between two such guides will be better appreciated. Moreover, it now should be understood that the lips or extensions 113, 114 (see FIG. 4) establish a movable wire flutter damping means of minimum size which rotate about the stationary form assembly 21.

Although the lips or extensions 113, 114 of the plates 123, 122, respectively, may be used, other aspects of the construction of the flyers 111, 112 are such that the need for such wire flutter damping means is substantially reduced, if not eliminated. More specifically, it will be noted from FIG. 6 that as the wire 26 exits the flyer tube 23 the wire at times will follow a gradually bending large radius of curvature path defined by the back side of the carbide guides 151 which are carried between the side plates 117, 118. The wire 26 would typically be in the position thereof against the guides during the time that a maximum feed rate of wire is occurring at the form assembly and maximum wire tension occurs. However, as the need for a high feed rate momentarily diminishes during a revolution increment of the flyer tube 26, the excess wire that is being pulsed down the flyer tube 26 (due to the wire inertia) is thrown outwardly to the solid line position thereof shown in FIG. 6 due to centrifugal forces associated with the high speed rotation of the flyer assembly. This centrifugal action tends to develop an accumulator loop of wire that is flung outwardly away from the carbide guides 151. This accumulator loop 26 tends thus to provide an extra amount of wire that is available for use in the next increment of revolution of the flyer tube 26 about the form assembly (as an increased feed rate of wire is needed). As the increased feed rate of wire is needed, the accumulator loop of wire (shown in the vicinity of reference numeral 158 in FIG. 6) supplies additional wire. Because of the establishment of the accumulator loop of wire and a tendency for such loop to be maintained by centrifugal action, the centrifugal action and unconfining nature of the flyer arm combine to provide a tensioning effect on the wire that extends from the flyer to the form assembly 21. Thus, as will now be understood, the wire moving down through the tube 23 tends to move at a more uniform velocity, with the peaks and pulsations in the instantaneous feed rate of the wire through the tube being averaged out due to the accumulator loop of wire generated by centrifugal forces.

It should now be understood that substantial benefits may be derived from utilizing only individual features that are suggested by FIGS. 4–7.

For example, improved winding action results by directing the flyer nozzle backwardly (with respect to the sense of revolution of the flyer) in order to improve the wrapping of wire about the form assembly and in order to reduce the sharp angles or bends that the wire would otherwise have to take during each turn generating revolution of the flyer. This feature may be utilized with prior art flyer structures as will be understood.

Another feature that may be used independently of all others is the feature best represented in FIG. 4 wherein wire flutter damping means are carried by the flyer nozzle itself, with such damping means rotating about the coil form assembly.

Still another feature susceptible of use of itself is the feature of feeding wire along an open-backed flyer so that centrifugal forces will not tend to throw the wire against a surface along which the wire enamel may be abraded.

Still yet another feature of the invention which may be utilized to advantage by itself is the concept of feeding wire from a wire supply to a flyer structure rotating about a form assembly and, in the vicinity of such flyer, establishing an accumulator loop of wire so that the peaks and pulsating feed rates may be averaged out with the end benefit of improved winding action about the form assembly and reduced wire enamel damage.

While in accordance with the patent statutes, there have now been described what at present are considered to be preferred embodiments of the invention, it will be obvious to those skilled in the art that numerous changes and modifications may be made therein without departing from the invention. It is therefore intended by the appended claims to cover all such changes and modifications as fall within the true spirit and scope of the invention.

What is claimed is:

1. In a dynamoelectric machine coil winding machine, of the type having a flyer arm rotatable about a stationary, multi-sized turn position coil form, the improvement comprising: a wire tensioning device mounted for rotation with the flyer arm and being in contact with the wire, between the flyer arm and the form to create a preselected degree of tension on the wire as it is being wound on the form, the tension being established after the wire exits the flyer arm and being sufficient to stabilize the wire to avoid inadvertent jumping of the wire to an undesired turn form position during the coil forming process and wherein the tensioning device comprises U-shaped bracket having parallel arms straddling the wire as it exits the flyer arm; at least one fixed wire bearing surface spanning the parallel arms at the open end of the bracket; a movable pressure block channelled between the parallel arms and having at least another wire bearing surface on the opposite side of the wire from said one surface; and means for applying a force to the pressure block in a direction to bring said surfaces into contact with said wire with a magnitude sufficient to create said preselected degree of tension in the wire during the winding process.

2. In a dynamoelectric machine coil winding machine, of the type having a flyer arm rotatable about a stationary, multi-sized turn position coil form, the improvement comprising: a wire tensioning device mounted for rotation with the flyer arm and being in contact with the wire, between the flyer arm and the form to create a preselected degree of tension on the wire as it is being wound on the form, the tension being established after the wire exits the flyer arm and being sufficient to stabilize the wire to avoid inadvertent jumping of the wire to an undesired turn form position during the coil forming process and wherein the tensioning device comprises a hollow bore column mounted to the flyer arm and having a threaded exterior circumference extending at least a portion of the axial length of this column; a slot extending through the walls of said column; a retainer pin positioned within said slot and being of a length slightly greater than the outer diameter of the column; an adjustment nut threaded onto said column and having a recess fitting over said pin and holding the pin within said slot; a U-shaped braket attached to one end of the column with parallel arms positioned to straddle the wire as it exits the flyer arm the connecting bight portion of the U-shaped bracket being attached to said column with a passage through the bight portion being in alignment with the column bore; a first abrasion resistant wire bearing surface spanning the parallel arms near the open end of the bracket and being on one side of the wire passing therethrough; a movable pressure block channelled between the parallel arms and having a pair of spaced apart abrasion resistant wire bearing surfaces on the opposite side of the wire from said one bearing surface; said pair of surfaces adapted to at least partially straddle said one surface crosswise of the direction of wire travel as it passes through the bracket; and a compression spring positioned within said hollow bore and bearing at one end against said retainer pin and at the other end against said pressure, whereby the adjustment nut may be set to provide a compression spring force against said pressure block to bring said bearing surfaces into contact with said wire with a magnitude sufficient to create said preselected degree of tension in the wire during the winding process.

3. The wire tensioning device of claim 2 wherein said wire bearing surfaces each comprise a solid cylinder of carbide steel.

* * * * *

UNITED STATES PATENT AND TRADEMARK OFFICE
CERTIFICATE OF CORRECTION

PATENT NO. : 4,387,745
DATED : June 14, 1983
INVENTOR(S) : Ronald H. Brown

It is certified that error appears in the above—identified patent and that said Letters Patent is hereby corrected as shown below:

Claim 1, line 29, after "comprises" insert --a--.

Signed and Sealed this

Twentieth Day of November 1984

[SEAL]

Attest:

GERALD J. MOSSINGHOFF

*Attesting Officer*  *Commissioner of Patents and Trademarks*